HOLD-DOWN MEANS FOR UNDERFLOOR ACCESS HOUSING

Original Filed July 9, 1971

INVENTOR.
FRANK W. FORK
BY
George E. Manias
AGENT

United States Patent Office

Re. 28,035
Reissued June 4, 1974

28,035
HOLD-DOWN MEANS FOR UNDERFLOOR ACCESS HOUSING

Frank W. Fork, Allison Park, Pa., assignor to H. H. Robertson Co., Pittsburgh, Pa.

Original No. 3,676,568, dated July 11, 1972, Ser. No. 161,221, July 9, 1971. Application for reissue June 22, 1973, Ser. No. 372,826
Int. Cl. H02g *3/04*
U.S. Cl. 174—49 9 Claims

Matter enclosed in heavy brackets [ ] appears in the original patent but forms no part of this reissue specification; matter printed in italics indicates the additions made by reissue.

ABSTRACT OF THE DISCLOSURE

An underfloor access housing adapted for use with electrical raceway units of the type normally placed in building floors. The access housing spans the distance between adjacent cells and overlies the crests thereof. Separate hold-down means are provided for quickly connecting the access housing to the raceway unit.

BACKGROUND OF THE INVENTION

1. Field of the invention

This invention relates to an underfloor access housing of the type known as a "pre-set insert" which is secured to the crests of adjacent raceways, and more particularly to improved hold-down means for rapidly and effectively connecting the access housing to the adjacent cells.

2. Description of the prior art

Underfloor access housings of the type which span across adjacent cells of an electrical raceway unit are known in the prior art, see copending application, Ser. No. 822,390 filed May 7, 1969, now U.S. Pat. No. 3,592,-956 assigned to the assignee of the present invention, and U.S. Pat. No. 3,303,264 (Saul et al., Feb. 7, 1967). Such access housings have been secured to the raceway unit by spot welding, riveting and like fastening operations. Spot welding is a time consuming operation requiring skilled personnel and special equipment. Riveting requires special field operations and is likewise time consuming.

SUMMARY OF THE INVENTION

The principal object of this invention is to provide improved hold-down means for rapidly and effectively connecting an underfloor access housing to the electrical raceway unit.

A further object of this invention is to provide improved hold-down means by which the underfloor access housing is automatically electrically grounded to the electrical raceway unit.

The present invention concerns an electrical access housing adapted for use with electrical raceway units of the type presenting alternating crests and troughs and providing generally parallel enclosed cells. The crests of a pair of adjacent cells each have an access opening. The underfloor access housing spans across one of the troughs and has opposite end portions overlying the crests of the adjacent cells. The access housing includes upstanding perimeter walls which enclose the crest openings and a top wall provided with an outlet opening. The overall arrangement is such that access to the interior of the housing may be gained through the top wall opening from the floor level. Access between the interior of the housing and each of the adjacent cells is provided by the crest openings.

In accordance with the present invention, separate hold-down means is provided for connecting the access housing to the raceway unit, with the opposite end portions of the access housing disposed in overlying engaged relation with the crests of adjacent cells. In accordance with one embodiment of the invention, the separate hold-down means are positioned along the opposite ends of the access housing. The hold-down means comprise resilient members having lower ends retained in slots provided in the crests of the raceway unit and upper ends hooked over the top wall of the access housing. The upper end of the resilient member may present serrations which engage the top wall of the access housing and provide effective electrical grounding of the access housing to the raceway unit. The top wall of the access housing may be provided with beads each of which is engaged by the upper end of the resilient member thereby to prevent inadvertent disengagement of the resilient member from the access housing.

In accordance with an alternative embodiment, a tab is provided along one end of the access housing. The tab extends from the housing and terminates in a downwardly inclined end which is retained by one of the slots. The other end of the housing is retained by means of one of the aforesaid resilient members.

In accordance with a further alternative embodiment, two of the aforesaid tabs are provided along a common side wall of the access housing. The ends of the tabs are retained by slots provided in the crests of the adjacent cells. An additional hold-down means in the form of a resilient member is provided which extends between the access housing and the raceway unit.

DESCRIPTION OF THE PREFERRED EMBODIMENT

Figure 1:
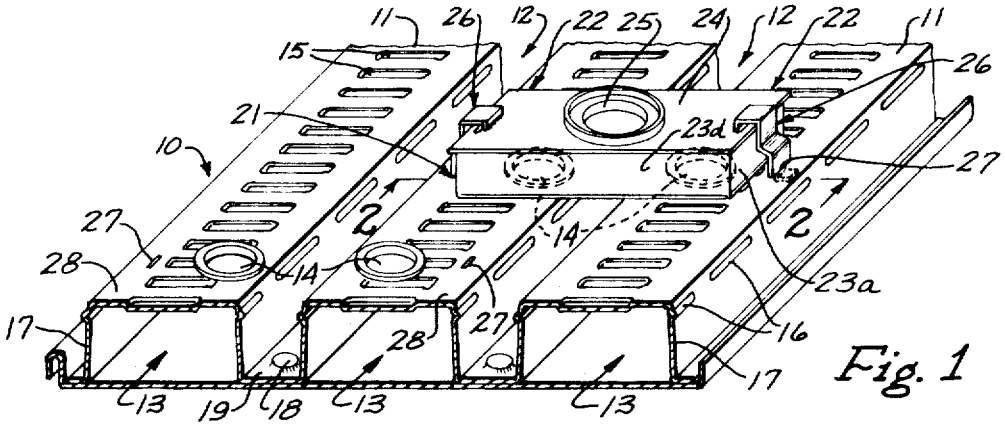
FIG. 1 is a fragmentary isometric view, illustrating an electrical access housing secured to an underfloor electrical raceway unit by the hold-down means of this invention.
Figure 2:
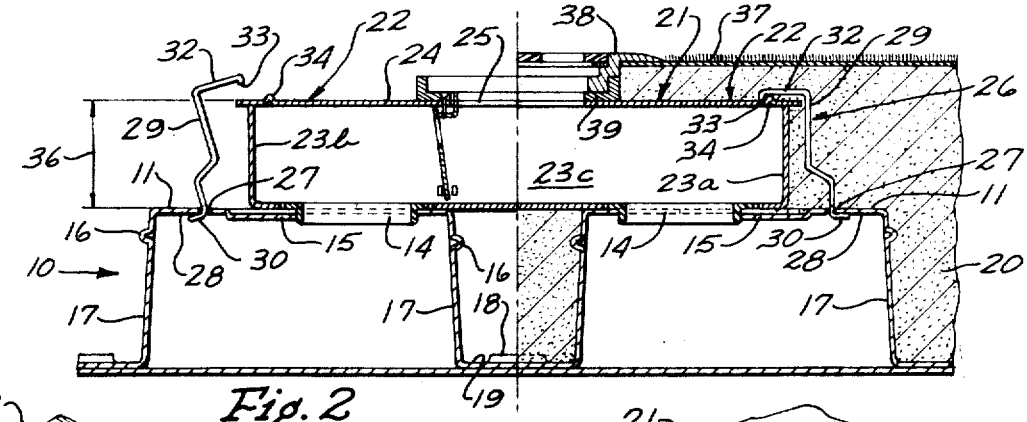
FIG. 2 is a cross-sectional view, taken essentially along the line 2—2 of FIG. 1, one-half of which illustrates the electrical raceway unit prior to pouring a layer of concrete and the other half of which illustrates a finished floor structure.

FIGS. 1 and 2 illustrate a cellular floor unit 10 which presents alternating crests 11 and troughs 12 and which provides generally parallel enclosed cells 13. The crests 11 of adjacent cells 13 have grommetted openings 14 for gaining access to the interior of the cell 13. The electrical raceway unit 10 may be of the type which achieves composite coacting with an overlying layer of concrete to produce a floor structure having improved unsupported span capabilities and improved load carrying capacity. In this instance, the electrical raceway unit 10 may be provided with indentations 15 in the crests 11, longitudinal embossments 16 in the generally vertical webs 17, and embossments 18 in the valley 19 of each of the troughs 12.

An underfloor access housing 21 is provided which spans across one oft he troughs 12 and has opposite end portions 22 overlying the crests 11 of adjacent cells 13. The access housing 21 presents upstanding perimeter walls including end walls 23a, 23b and side walls 23c, 23d (FIG. 1) which enclose the grommetted crest openings 14 and a top wall 24 provided with an outlet opening 25.

In accordance with the present invention, separate hold-down means 26 are provided for rapidly and effectively connecting the access housing 21 to the adjacent cells 13.

In the preferred arrangement, a slot 27 preferably is provided in that flat portion 28 of the crest 11 residing between the indentation 15 and the intersection of the crest 11 with the generally vertical web 17. Each slot 27 is spaced from one of the grommetted openings 14 and one of the end walls 23a, 23b of the housing 21. The slots 27 and the openings in the crest 11 may be formed by a single stamping operation.

Figure 3:
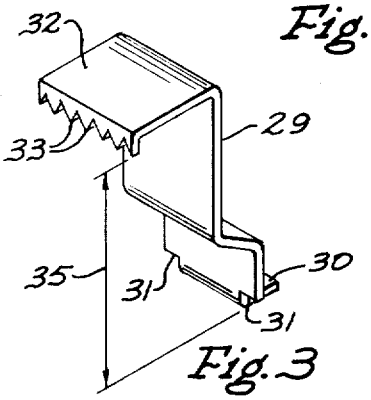
FIG. 3 is an isometric view of a resilient member.

Referring to FIG. 3, the present hold-down means also includes a resilient member 29 presenting a tab or lower end 30 below a pair of shoulders 31 and a hook or upper end 32 which presents serrations 33. The resilient member 29 may be formed from thin gauge spring steel. The resilient member 29 is installed by inserting the tab 30 into the slot 27, as shown in the left-hand side of FIG. 2. Thereafter, the upper end 32 is hooked over the top wall 24 of the housing 21, as shown in the right-hand side of FIG. 2. The top wall 24 may be provided with a surface irregularity, such as a bead 34, which is engaged by the serrations 33 thereby to prevent inadverent disengagement of the upper end 32 from the access housing 21. The spacing 35 (FIG. 3) between the top surface of the tab 30 and the lower edge of the serrations 33 is less than the spacing 36 (FIG. 2) between the upper surfaces of the crest 11 and the top wall 24. Thus, the serrations 33 are urged into engagement with the top wall 24 and provide good electrical grounding of the access housing 21 to the raceway unit 10.

The present hold-down means 26 securely retains the housing 21 in position over the raceway unit 10 during pouring of the concrete 20. (FIG. 2). After the concrete 20 has hardened, a suitable decorative cover such as carpet 37 may be applied over the upper surface of the concrete 20. A finishing ring 38 may be secured to the mounting ring 39 which is carried by the access housing 21.

Figure 4:
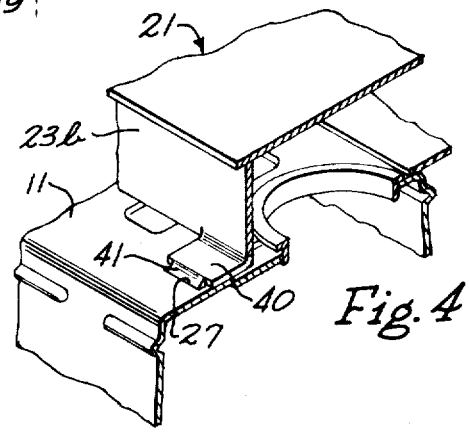
FIG. 4 is a fragmentary, cross-sectional isometric view of a portion of the access housing installed over a cell of an electrical raceway unit, illustrating alternative hold-down means.
Figure 5:
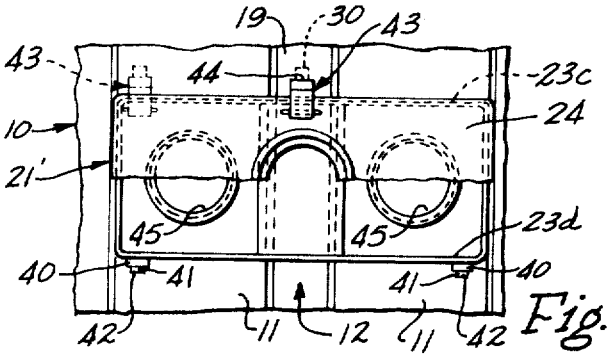
FIG. 5 is a fragmentary plan view of the access housing installed over the raceway unit, illustrating further alternative hold-down means of this invention.

Alternative embodiments of the present hold-down means are illustrated in FIGS. 4 and 5 wherein corresponding numerals are employed to identify corresponding parts heretofore described.

FIG. 4 illustrates an alternative hold-down means which may be used in conjunction with one of the hold-down means 26 (FIG. 1). In this embodiment, one of the hold-down means comprises a tab 40 which may be formed from a portion of the end wall 23b of the access housing 21. The tab 40 extends outwardly from the end wall 23b and terminates in a downwardly inclined end 41. When installing the access housing 21, the downwardly inclined end 41 is introduced into the slot 27 of one of the crests 11. The opposite end of the access housing 21 is connected to the cell by the hold-down means 26, as shown in FIG. 2.

FIG. 5 illustrates a further alternative embodiment wherein two of the tabs 40 extend from the common perimeter side wall 23d and have their ends 41 retained in slots 42 formed in the crests 11 of the raceway unit 10. Additional hold-down means in the form of a resilient member 43 positioned adjacent to the opposite side wall 23c of the access housing 21, extends between the top wall 24 of the housing 21 and the raceway unit 10. The resilient member 43 may, for example, have its lower end 30 retained in a slot 44 provided in a valley 19 of the trough 12. Alternatively, the resilient member 43 may, as shown in dash-dot outline, extend between the access housing 21 and one of the crests 11.

The arrangements illustrated in FIG. 5 permit the use of a larger access housing 21' and permits larger diameter grommetted crest openings 45 to be formed in the crests 11—compare the access housings 21 and 21' and the grommetted openings 14 and 45 of FIGS. 1 and 5.

It will be appreciated that the present invention provides hold-down means by which the access housing may be rapidly and effectively connected to the adjacent cells of an electrical raceway unit. The connection is made without the need for field operations heretofore required when installing prior art access housings. Moreover, the present hold-down means provides automatic electrical grounding of the access housing to the electrical raceway unit.

I claim:

1. In an electrical wiring distributing floor structure including electrical raceway units, presenting alternating crests and troughs and providing generally parallel enclosed cells, the *cells* [crests] of a pair of adjacent cells each having an outlet opening, an access housing spanning across one of said troughs and having opposite end portions overlying the crests of said pair of adjacent cells, said access housing including upstanding side walls and end walls [enclosing] *surrounding* said outlet openings [in said crests] and a top wall provided with an outlet opening, the improvement comprising:

each of said crests having a slot spaced from said access housing; and separate hold-down means for detachably retaining each of said end portions of said access housing in overlying engaged relation with the crests of said pair of adjacent cells, each said hold-down means having an end retained in one said slot.

2. The improvement defined in claim 1 wherein at last one of said hold-down means comprises a resilient member having a lower end retained in said one said slot and an upper end hooked over said top wall of said access housing.

3. The improvement defined in claim 2 wherein said upper end presents serrations engaged with said top wall.

4. The improvement defined in claim 2 wherein said top wall includes at least one bead which is engaged by said upper end of said resilient member thereby to prevent inadvertent disengagement of said resilient member from said access housing.

5. The improvement defined in claim 1 wherein at least one of said separate hold-down means comprises a tab having one end joined to said access housing and an opposite end retained in one said slot.

6. The improvement defined in claim 1 including additional hold-down means comprising a resilient member extending between said access housing and said electrical raceway unit.

7. The improvement defined in claim 6 wherein said resilient member has a lower end retained in an additional slot formed in one said crest of said adjacent cells.

8. The improvement defined in claim 6 wherein said resilient member has a lower end retained in an additional slot formed in a bottom wall of said trough.

9. The improvement defined in claim 6 wherein said separate hold-down means comprise tabs having corresponding ends joined to a common said side wall of said access housing and corresponding opposite ends retained in the slots of the crests of said adjacent cells.

References Cited

The following references, cited by the Examiner, are of record in the patented file of this patent or the original patent.

UNITED STATES PATENTS

| | | | |
|---|---|---|---|
| 1,429,952 | 9/1922 | Kearney | 248—361 B |
| 2,402,682 | 6/1946 | Shriro et al. | 248—361 B |
| 3,303,264 | 2/1967 | Saul et al. | 174—48 |
| 3,592,956 | 7/1971 | Fork | 174—49 |
| 3,609,210 | 9/1971 | Guritz | 174—49 |

BERNARD A. GILHEANY, Primary Examiner

D. A. TONE, Assistant Examiner

U.S. Cl. X.R.

52—221; 174—51; 248—361 B